(12) United States Patent
Tiedemann

(10) Patent No.: US 9,617,929 B2
(45) Date of Patent: Apr. 11, 2017

(54) METHOD FOR ADJUSTING THE ROTATIONAL SPEED OF AN INTERNAL COMBUSTION ENGINE OF A ROAD-BUILDING MACHINE, AND ROAD-BUILDING MACHINE FOR SAID METHOD

(71) Applicant: ABG Allgemeine Baumaschinen-Gesellschaft mbH, Hameln (DE)

(72) Inventor: Heinz Tiedemann, Emmerthal (DE)

(73) Assignee: ABG Allgemeine Baumaschinen-Gesellschaft MBH, Hameln (DE)

( * ) Notice: Subject to any disclaimer, the term of this patent is extended or adjusted under 35 U.S.C. 154(b) by 0 days.

(21) Appl. No.: 14/421,669

(22) PCT Filed: Dec. 10, 2012

(86) PCT No.: PCT/EP2012/005086
§ 371 (c)(1),
(2) Date: Feb. 13, 2015

(87) PCT Pub. No.: WO2014/029410
PCT Pub. Date: Feb. 27, 2014

(65) Prior Publication Data
US 2015/0300275 A1    Oct. 22, 2015

(30) Foreign Application Priority Data
Aug. 18, 2012    (DE) ........................ 10 2012 016 445

(51) Int. Cl.
*E01C 19/00*    (2006.01)
*F02D 31/00*    (2006.01)
(Continued)

(52) U.S. Cl.
CPC ........... *F02D 31/007* (2013.01); *B60W 10/06* (2013.01); *B60W 10/103* (2013.01);
(Continued)

(58) Field of Classification Search
CPC .... B60W 10/06; B60W 10/30; B60W 10/103; B60W 30/1882; B60W 30/1886;
(Continued)

(56) References Cited

U.S. PATENT DOCUMENTS 5,214,916 A    6/1993    Lukich
6,314,727 B1    11/2001    Prabhu
(Continued)

FOREIGN PATENT DOCUMENTS

DE            3911401 C1    4/1989
DE    112008002048 T5    6/2010
(Continued)

OTHER PUBLICATIONS

Opposition against DE 102012016445, filed by BOMAG GmbH on Aug. 29, 2013.
(Continued)

*Primary Examiner* — Raymond W Addie
(74) *Attorney, Agent, or Firm* — Kilpatrick Townsend & Stockton LLP

(57) ABSTRACT

A method for adjusting the rotational speed of an internal combustion engine of a road-building machine which, in addition to a traction drive, has hydraulic motors which are connected to the internal combustion engine and which serve for driving working assemblies, in which method the rotational speed is adjusted as a function of the present power demand of the working assemblies, characterized in that the hydraulic motors are operated using fixed-displacement pumps, and residual volume flows presently to be discharged are reduced by flow valves for hydraulic motors
(Continued)

of active working assemblies, for which purpose the rotational speed of the internal combustion engine is automatically adapted during working operation.

12 Claims, 1 Drawing Sheet

(51) Int. Cl.
| | |
|---|---|
| B60W 10/06 | (2006.01) |
| B60W 10/103 | (2012.01) |
| B60W 10/30 | (2006.01) |
| B60W 30/188 | (2012.01) |
| E01C 19/48 | (2006.01) |
| F16H 61/4035 | (2010.01) |
| F16H 61/4148 | (2010.01) |
| F16H 61/448 | (2010.01) |
| F16H 61/46 | (2010.01) |
| E01C 19/02 | (2006.01) |
| E01C 19/12 | (2006.01) |
| E01C 19/22 | (2006.01) |

(52) U.S. Cl.
CPC ........ *B60W 10/30* (2013.01); *B60W 30/1882* (2013.01); *B60W 30/1886* (2013.01); *E01C 19/002* (2013.01); *E01C 19/02* (2013.01); *E01C 19/12* (2013.01); *E01C 19/22* (2013.01); *E01C 19/48* (2013.01); *F16H 61/4035* (2013.01); *F16H 61/4148* (2013.01); *F16H 61/448* (2013.01); *F16H 61/461* (2013.01); *B60Y 2200/414* (2013.01)

(58) Field of Classification Search
CPC ........ E01C 19/002; E01C 19/02; E01C 19/12; E01C 19/22; E01C 19/48; F02D 31/007; F16H 61/448; F16H 61/461; F16H 61/4148; F16H 61/4035; B60Y 2200/414
USPC ........................................ 404/72, 84.05, 118
See application file for complete search history.

(56) References Cited

U.S. PATENT DOCUMENTS

| | | | |
|---|---|---|---|
| 7,665,971 | B1 | 2/2010 | Glickman |
| 2009/0143952 | A1 | 6/2009 | Chisholm |
| 2013/0294833 | A1* | 11/2013 | Engel ..................... E01C 19/48 404/118 |

FOREIGN PATENT DOCUMENTS

| | | |
|---|---|---|
| EP | 2333157 A1 | 6/2011 |
| WO | WO/2010/006759 A1 | 1/2010 |

OTHER PUBLICATIONS

International Search Report and Written Opinion of PCT/EP2012/005086, dated Mar. 18, 2013, 7 pages.
English translation of the International Preliminary Report on Patentability of PCT/EP2012/005086, dated Feb. 24, 2015.

* cited by examiner

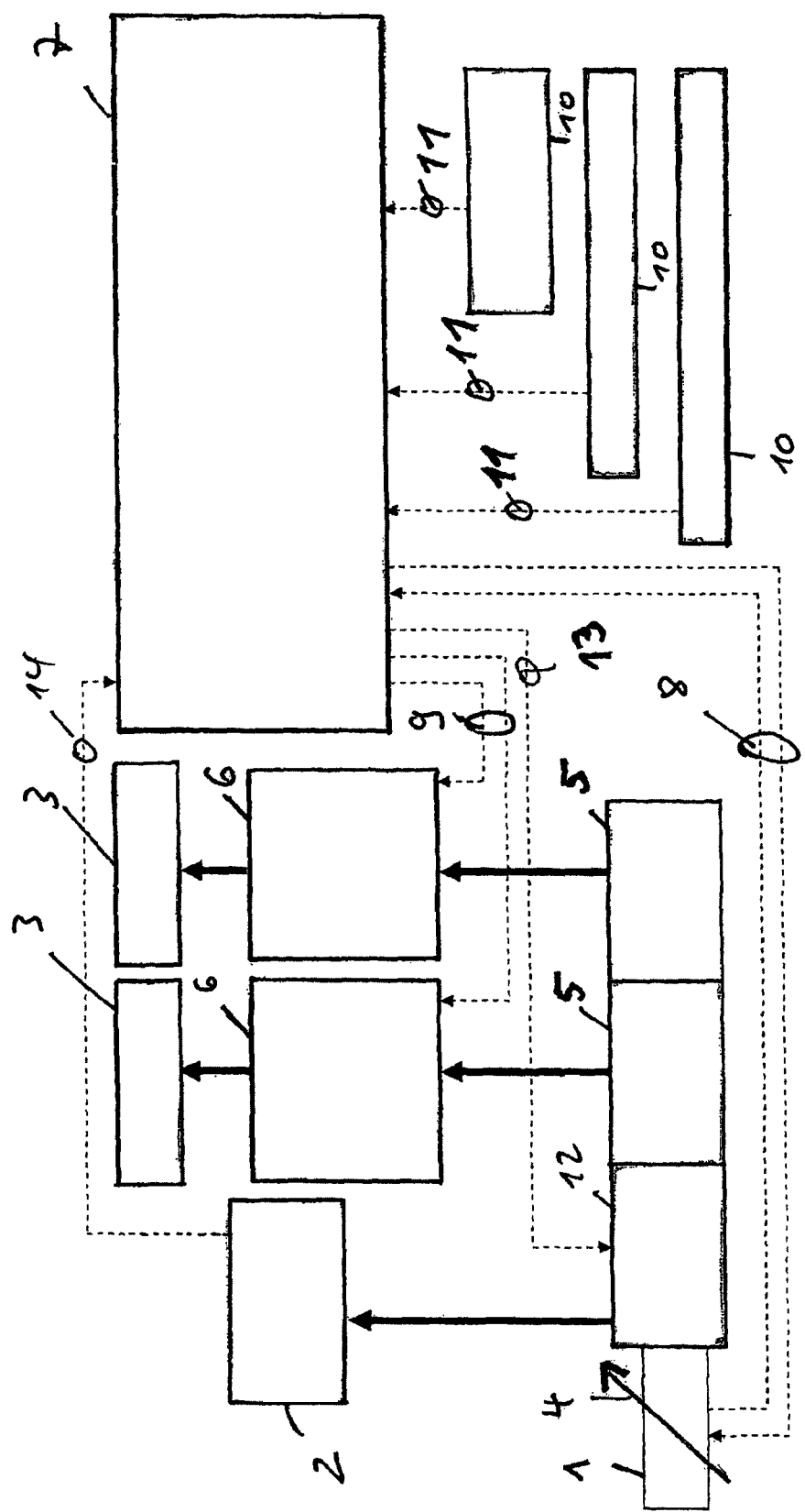

METHOD FOR ADJUSTING THE ROTATIONAL SPEED OF AN INTERNAL COMBUSTION ENGINE OF A ROAD-BUILDING MACHINE, AND ROAD-BUILDING MACHINE FOR SAID METHOD

The invention relates to a method for adjusting the rotational speed of an internal combustion engine of a road-building machine, according to the preamble of claim 1, and a road-building machine having an internal combustion engine, according to the preamble of claim 7.

From DE 39 11 401 C1 it is known that, in a road finisher, the rotational speed is in practice regulated manually by the driver. In transport journeys and transfer journeys, the power of the diesel engine is needed mainly for the traction drive. Different driving situations are taken into account by the driver by continuous regulation of the rotational speed of the diesel engine. For paving-working operation, the diesel engine runs, however, at the nominal rotational speed. The driver generally makes no adjustments, since he is unaware of the actual power requirement and must avoid a situation in which working assemblies which are required during interruptions have not been supplied with the necessary power. The environment is unnecessarily polluted by noise and exhaust gases. Fuel is also wasted unnecessarily.

In order that, during operation of the road finisher, the environmental pollution and fuel consumption are reduced without demanding the attention of the driver, it is known from DE 39 11 401 C1 to automatically adapt the rotational speed of the diesel engine, during interruption of the paving-driving operation, to the power requirement of the working assemblies. The adaptation can here be conducted such that, dependent on the current power requirement, intermediate rotational speed values between the two limit values of the nominal rotational speed and the idle speed can be set. The rotational speed is adapted to the current power requirement by means of an adjusting device. Upon interruption or after interruption of the paving-driving operation, the rotational speed is immediately adapted by means of the adjusting device without influence of the driver being necessary in this process. During paving-driving operation, the rotational speed of the diesel engine is accelerated to the nominal rotational speed and is maintained without change. The environmental pollution by noise or exhaust gases is perceptibly reduced.

From WO 2010/006759 A1 it is known that, for laying the road surface, above all the traction drive of the road finisher, the drive for the tamper bar and/or the vibrators are operated at constant rotational speed or frequency in order that the road surface produced by the road finisher does not change. If, for this purpose, the internal combustion engine is operated at constant rotational speed, the internal combustion engine frequently, however, generates too much energy. In order to operate the road finisher economically, the rotational speed of the internal combustion engine is raised or lowered in such a way that the energy which is required for a paving condition in order to keep the rotational speed or frequency constant is supplied these drives which are to be kept constant. Other drives, for instance for the conveyor for transporting the material of the road surface and for the spreading augers, can change with the alteration of the rotational speed of the internal combustion engine, since these have no influence on the laid road surface. The power requirement of the drives which are to be kept constant is measured and, with that, the rotational speed of the internal combustion engine is altered by means of a control system, so that said internal combustion engine generates as much more or less energy as to compensate the changed energy requirement of the drives which are to be kept constant. In this context, it is disadvantageous that the load-dependent change in the rotational speed of the internal combustion engine is determined by keeping at least one drive approximately constant. The increase or reduction in the rotational speed of the internal combustion engine is governed by how much energy is required in order that with changing loads, for example rising or falling slopes, the drives which are to be kept constant are kept at least approximately constant. Here too, the internal combustion engine of the road finisher frequently generates too much energy, since the preset of the at least one drive which is to be kept approximately constant adversely restricts the load-dependent adjustment of the rotational speed of the internal combustion engine.

The object of the invention is therefore to provide a method for adjusting the rotational speed of an internal combustion engine of a road-building machine, and a road-building machine for said method, which allow an economical operation of the road-building machine.

This object is achieved by the features of claims 1 and 7.

A method and a road-building machine is hereby provided, in which the rotational speed of the internal combustion engine is automatically adapted to the respective current power requirement of the active working assemblies in the paving-working operation. The rotational speed of the internal combustion engine is adjusted to such a rotational speed at which the residual volume flows of fixed displacement pumps for driving hydraulic motors are reduced. The reduction is preferably a minimization in such a way that the residual volume flow of the at any one time highest loaded working assembly, i.e. where the largest volume flow is present, is approximately zero.

The currently highest necessary volume flow at any one time can be used as a measure of the possible reduction in rotational speed relative to the nominal rotational speed of the internal combustion engine. The internal combustion engine thus forms a real flow regulator, which is controllable by means of the adjustment of its rotational speed. The engine power is usually constant within a large range of rotational speed, so that the rotational speeds can be varied.

The traction drive is fed by means of an independently adjustable hydraulic pump. The paving speed is adaptable to whether the degree of load-dependent energy saving is fully or only partially utilized.

The use of flow control valves in conjunction with fixed displacement pumps is a cheaper solution than the use of variable displacement pumps. The fixed displacement pumps ideed always generate the full volume flow, so that the residual volume flow which is not required has to be discharged via a valve. However, according to the invention the losses which are herein incurred are reduced, so that this drawback is remedied by the inventive energy optimization measure.

Preferably, the flow control valves of the active working assemblies are connected to a controller, which varies the residual volume flows in a load-dependent manner, wherein the highest volume flow can be made to a residual volume flow of approximately zero via the adjustment of the rotational speed of the internal combustion engine. The associated flow control valve is then, for instance, fully open.

Further embodiments of the invention can be derived from the following description and the subclaims.

The invention is explained in greater detail below with reference to the illustrative embodiment represented in the appended drawing.

FIG. 1 shows a block diagram for the adjustment of the rotational speed of an internal combustion engine of a road-building machine.

As shown in FIG. 1, the invention relates to a method for adjusting the rotational speed of an internal combustion engine 1 of a road-building machine, in particular of a road finisher, a road milling machine or the like, which, in addition to a traction drive 2, has hydraulic motors 3, connected to the internal combustion engine 1, for the driving of working assemblies. In a road finisher, the working assemblies include, for instance, a tamper bar, a vibration device for a screed, a conveyor belt for material to be laid, and a spreading auger, which, moreover, are able to be provided in multipart or multiple arrangement.

The rotational speed of the internal combustion engine 1 can be adjusted dependent on the current power requirement of the working assemblies, for which purpose the internal combustion engine 1 has a rotational speed adjusting device 4.

The hydraulic motors 3 are operated using fixed displacement pumps 5. The fixed displacement pumps 5 always generate the full volume flow for a specific rotational speed of the internal combustion engine. The amount of the constant volume flow is set by the rotational speed of the internal combustion engine 1.

Since the fixed displacement pumps 5 always generate the full volume flow, a residual volume flow which is not required for the respective hydraulic motor 3 that is to be fed is discharged via a flow control valve 6. The residual volume flows of the flow control valves 6 for hydraulic motors 3 of active working assemblies, which residual volume flows are currently to be discharged dependent on a paving-working operation of the road-building machine, are now reduced according to the invention, for which purpose the rotational speed of the internal combustion engine is automatically adapted during paving-working operation. An increase or reduction of the rotational speed of the internal combustion engine 1 increases or reduces the volume flow of the fixed displacement pumps 5. By means of the adjustment of the rotational speed of the internal combustion engine 1, the volume flow of the fixed displacement pumps 5 is consequently altered such that the residual volume flows of the fixed displacement pumps 5 are influenced in an energy-optimized manner. In paving-working operation, the internal combustion engine 1 is consequently no longer operated at the nominal rotational speed, but at a rotational speed which is set on a load-dependent basis and is dependent on the power requirement of the active working assemblies. The power requirement or energy requirement is here, in particular, a volume or rotational speed requirement.

To this end, a controller 7, which conducts an adaptation of the rotational speed of the internal combustion engine 1 via a rotational speed signal line 8, is provided.

The adaptation is preferably realized such that the flow control valve 6 of the hydraulic motor 3 of the currently highest loaded working assembly, having then the smallest residual volume flow, gives the setting of the rotational speed signal for the adjustment of the rotational speed of the internal combustion engine 1. The optimization of energy usage by adjustment of the rotational speed of the internal combustion engine 1 can be done to the point where at least one, preferably the smallest of the residual volume flows, is brought to approximately zero. The remaining residual volume flows inevitably follow this degree of adjustment and are likewise reduced. Since the energy requirement of the hydraulic motors 3 for the various working assemblies in paving-working operation is different, the degree of the reduction of the residual flows is likewise different. The controller 7 adjusts the flow control valves 6 via a control line 9.

The reduction of the residual volume flows of the flow control valves 6 of a plurality of hydraulic motors 3 can be linked in the manner of a master-slave architecture, according to which the residual volume flow of the flow control valve 6 of the hydraulic motor 3 of the currently highest loaded working assembly determines the setting of the rotational speed signal as the master, which the flow control valves 6 of the hydraulic motors 3 of the other active working assemblies follow as slaves.

Preferably, at least the residual volume flow of the at any one time highest loaded working assembly is minimized or adjusted approximately to zero. The highest consumer then receives the full volume flow of the associated fixed displacement pump 5 as a result of the appropriately adjusted rotational speed of the internal combustion engine 1, while the flow control valves 6 can still discharge residual volume flows, which then, however, are at least reduced. The road-building machine is thereby operated more economically.

The current power requirement of individual working assemblies is detected and notified to the control device 7. By means of sensors 10, which are connected via data lines 11 to the controller 7, the energy requirement of the individual active working assemblies during paving-working operation can be continuously determined and delivered as input data to the controller 7 for an automatic load-dependent adaptation of the rotational speed of the internal combustion engine 1.

For the traction drive 2, an additional hydraulic pump 12 is provided in order to be able to adjust the traction drive independently from the rotational speed of the internal combustion engine 1. Via control lines 13, 14, the controller 7 can adjust the traction drive independently from the energy-optimized adjustment of the rotational speed of the internal combustion engine 1, since also an energy-optimized reduction of the rotational speed of the internal combustion engine 1 relative to its nominal rotational speed in a paving-working operation provides sufficient power for the traction drive 2 to enable adjustment to a selectable running speed.

For the implementation of the above-described method, a road-building machine, in particular a road finisher, having an internal combustion engine 1 for driving a traction drive 2 as well as a plurality of hydraulic motors 3 for working assemblies (not shown), is provided. In addition, a control apparatus for a controller 7 for adjusting the rotational speed of the internal combustion engine 1 dependent on the current power requirement of the working assemblies is provided.

Each of the plurality of hydraulic motors 3 can be operated by means of a fixed displacement pump 5, which is drivable by the internal combustion engine 1 and the full volume flow of each of which can be influenced by means of a respective flow control valve 6, and the controller 7 of the control device is connected as a connecting link between the flow control valves 6 of the hydraulic motors 3 and a rotational speed sensor of the internal combustion engine 1 and has an adaptation control circuit, which provides a rotational speed signal set to a reduction of the residual volume flows of the flow control valves 6 for hydraulic motors 3 of active working assemblies, which residual volume flows are currently to be discharged.

The adaptation control circuit for making a selection can be designed such that the flow control valve 6 of the hydraulic motor 3 of the currently highest loaded working assembly, having then the smallest residual volume flow, gives the setting of the rotational speed signal for the adjustment of the rotational speed of the internal combustion engine 1.

The adaptation control circuit can be designed for linking the reduction of the residual volume flows of the flow control valves 6 of a plurality of hydraulic motors 3 in the manner of a master-slave architecture.

The invention claimed is:

1. A method for adjusting the rotational speed of an internal combustion engine of a road-building machine, which, in addition to a traction drive, has hydraulic motors, connected to the internal combustion engine, for the driving of working assemblies, and in which method the rotational speed is adjusted dependent on the current power requirement of the working assemblies, wherein the hydraulic motors are operated using fixed displacement pumps and residual volume flows of flow control valves for hydraulic motors of active working assemblies, which residual volume flows are currently to be discharged, are reduced, for which purpose the rotational speed of the internal combustion engine is automatically adapted during working operation, the method comprising adjusting using a controller the flow control valves via a control line.

2. The method according to claim 1, further comprising adjusting with the controller such that the flow control valve of the hydraulic motor of the currently highest loaded working assembly, having then the smallest residual volume flow, gives the setting of the rotational speed signal for the adjustment of the rotational speed of the internal combustion engine.

3. The method according to claim 2, wherein the reduction of the residual volume flows of the flow control valves of a plurality of hydraulic motors is linked in the manner of a master-slave architecture, according to which the residual volume flow of the flow control valve of the hydraulic motor of the currently highest loaded working assembly determines the setting of the rotational speed signal as the master, which the flow control valves of the hydraulic motors of the other active working assemblies follow as slaves.

4. The method according to claim 1, further comprising minimizing at least the residual volume flow of the at any one time highest loaded working assembly.

5. The method according to claim 1, further comprising detecting the current power requirement of individual working assemblies and notifying the control apparatus.

6. The method according to claim 1, further comprising operating the traction drive independently from the rotational speed of the internal combustion engine.

7. A road-building machine having an internal combustion engine for driving a traction drive as well as a plurality of hydraulic motors for working assemblies, and having a controller for adjusting the rotational speed of the internal combustion engine dependent on the current power requirement of the working assemblies, wherein each of the plurality of hydraulic motors can be operated by means of a fixed displacement pump, which is drivable by the internal combustion engine and the full volume flow of each of which can be influenced by means of a respective flow control valve, and the controller is connected as a connecting link between the flow control valves of the hydraulic motors and a rotational speed sensor of the internal combustion engine and has an adaptation control circuit, which provides a rotational speed signal set to a reduction of the residual volume flows of the flow control valves for hydraulic motors of active working assemblies, which residual volume flows are currently to be discharged, wherein the controller adjusts the flow control valves via a control line.

8. The road-building machine according to claim 7, wherein the adaptation control circuit is designed for making a selection according to which the flow control valve of the hydraulic motor of the currently highest loaded working assembly, having then the smallest residual volume flow, gives the setting of the rotational speed signal for the adjustment of the rotational speed of the internal combustion engine.

9. The road-building machine according to claim 8, wherein the adaptation control circuit is designed for linking the reduction of the residual volume flows of the flow control valves of a plurality of hydraulic motors in the manner of a master-slave architecture, according to which the residual volume flow of the flow control valve of the hydraulic motor of the currently highest loaded working assembly determines the setting of the rotational speed signal as the master, which the flow control valves of the hydraulic motors of the other active working assemblies follow as slaves.

10. The road-building machine according to claim 7, wherein sensors, which indicate the current power requirement of individual working assemblies, are connected to the controller.

11. The road-building machine according to claim 7, wherein the controller is connected to a traction drive pump, which is driven by the internal combustion engine, in order to regulate a traction drive motor, which is fed by the traction drive pump, to a selectable running speed independently from the rotational speed of the internal combustion engine.

12. A road finisher configured according to claim 7, wherein the working assemblies are a tamper and vibrators of a paving screed, a spreading auger, and a conveyor of a road finisher.

* * * * *